United States Patent
Tsutsui et al.

(10) Patent No.: US 7,852,553 B2
(45) Date of Patent: Dec. 14, 2010

(54) MICROSCOPE ILLUMINATION APPARATUS

(75) Inventors: Ryo Tsutsui, Akishima (JP); Yoshihiro Shimada, Sagamihara (JP)

(73) Assignee: Olympus Corporation, Tokyo (JP)

( * ) Notice: Subject to any disclaimer, the term of this patent is extended or adjusted under 35 U.S.C. 154(b) by 459 days.

(21) Appl. No.: 11/928,742

(22) Filed: Oct. 30, 2007

(65) Prior Publication Data

US 2008/0106787 A1 May 8, 2008

(30) Foreign Application Priority Data

Nov. 2, 2006 (JP) ............................. 2006-298676
May 25, 2007 (JP) ............................. 2007-139328

(51) Int. Cl.
*G02B 21/06* (2006.01)

(52) U.S. Cl. ...................... 359/385; 359/390

(58) Field of Classification Search ................ 359/385, 359/390; 362/227, 231, 232, 247, 285, 572–575
See application file for complete search history.

(56) References Cited

U.S. PATENT DOCUMENTS

| | | | | |
|---|---|---|---|---|
| 6,007,255 | A * | 12/1999 | Krauter et al. | 385/53 |
| 6,429,968 | B1 * | 8/2002 | Carver | 359/385 |
| 7,215,468 | B2 * | 5/2007 | Nakata | 359/386 |
| 7,233,437 | B2 * | 6/2007 | Hirata et al. | 359/385 |
| 7,262,909 | B2 * | 8/2007 | Bösser et al. | 359/385 |
| 2004/0090794 | A1 | 5/2004 | Scott et al. | |

FOREIGN PATENT DOCUMENTS

| | | |
|---|---|---|
| EP | 1602960 A1 | 12/2005 |
| JP | 2003195177 | 7/2003 |
| JP | 2005010296 | 1/2005 |
| WO | 2006072886 A1 | 7/2006 |

OTHER PUBLICATIONS

Schroder, Gottfried, "Faseroptik und weitere Bauelemente", Technische optik, Vogel Buchverlag, 1998, pp. 97-104.
Extended European Search Report, dated Feb. 27, 2008, from corresponding foreign application, 8 pp.

* cited by examiner

*Primary Examiner*—Frank G Font
(74) *Attorney, Agent, or Firm*—Pillsbury Winthrop Shaw Pittman, LLP

(57) ABSTRACT

A microscope illumination apparatus, which has at least three kinds of light sources, each of a different emission wavelength region and a different figure and size of the light-emitting section, and supplies emitted light from individual light sources as illumination light for observing a specimen to the microscope body, includes collimator lenses converting incident rays into parallel rays, arranged on the exit sides of the individual light sources; a path sharing means introducing light emerging from the collimator lenses into a common optical path; an imaging lens, placed on the common optical path, forming images of the individual light sources introduced into the common optical path through the path sharing means at a common position; and an optical fiber placed so that the entrance end face of the optical fiber is located at a position where the images of the individual light sources are formed through the imaging lens.

7 Claims, 9 Drawing Sheets

PROJECTION MAGNIFICATION OF LIGHT SOURCE 11 : β11

PROJECTION MAGNIFICATION OF LIGHT SOURCE 12 : β12

PROJECTION MAGNIFICATION OF LIGHT SOURCE 13 : β13

MICROSCOPE ILLUMINATION APPARATUS

This application claims benefits of Japanese Application Nos. 2006-298676 filed in Japan on Nov. 2, 2006, and 2007-139328 filed in Japan on May 25, 2007, the contents of which are incorporated herein by reference.

BACKGROUND OF THE INVENTION

1. Field of the Invention

This invention relates to a microscope illumination apparatus which has at least three kinds of light sources, each of a different emission wavelength region and a different figure of a light-emitting section, and is capable of supplying light of a desired wavelength to a microscope body in accordance with a desired fluorescence observation.

2. Description of Related Art

As this type of conventional microscope illumination apparatus, the light source section of a fluorescence microscope set forth, for example, in Japanese Patent Kokai No. 2005-10296 is available.

FIG. 1 shows essential parts of one structural example of the microscope illumination apparatus set forth in Kokai No. 2005-10296.

The microscope illumination apparatus of FIG. 1 has three light sources of different wavelength regions (an LED unit including a red LD 151, a green LED 152, and a blue LED 153); a collimator lens unit 154; a mirror 155; a dichroic mirror 156; a lens 157; and an optical fiber 158. Light emitted from the individual light sources 151-153 is introduced into one optical path through the mirror 155 and the dichroic mirror 156 and is rendered incident on the entrance end face of the optical fiber 158 through the lens 157. In this case, in light sources in which emitted rays are liable to be diffused (the green LED 152 and the blue LED 153), the emitted rays are converted into parallel rays through the collimator lens unit 154.

The light emerging from the optical fiber 158 is supplied to the microscope body through a projection means, not shown in the figure, such as a collimator lens.

In the light source such as the LED or LD, the figure and size of the light-emitting section vary with the emission wavelength region.

However, when the figure and size of the light-emitting section vary, the size of the image of the light source formed on the entrance end face of the optical fiber and an angle of incidence of a ray vary with the light source. In the optical fiber, the minimum angle at which incident light is totally reflected (a critical angle) varies with an incident wavelength.

SUMMARY OF THE INVENTION

The microscope illumination apparatus according to the present invention, which has at least three kinds of light sources, each of a different emission wavelength region and a different figure and size of the light-emitting section, and supplies emitted light from individual light sources as illumination light for observing a specimen to the microscope body, comprises collimator lenses converting incident rays into parallel rays, arranged on the exit sides of the individual light sources; a path sharing means introducing light emerging from the collimator lenses into a common optical path; an imaging lens placed on the common optical path, forming images of the individual light sources introduced into the common optical path through the path sharing means at a common position; and an optical fiber placed so that the entrance end face of the optical fiber is located at a position where the images of the individual light sources are formed through the imaging lens. The collimator lenses are constructed to have optical properties varying with the emission wavelength regions and the figures and sizes of the light-emitting sections in the individual light sources so that an angle of incidence of light emitted from each of the corresponding light sources on the optical fiber through the imaging lens becomes smaller than a critical angle of the optical fiber and each of images of the light sources formed through the imaging lens has the maximum size to such an extent that the image is not larger than the entrance end face of the optical fiber.

In the microscope illumination apparatus of the present invention, it is desirable that, the collimator lenses are constructed so that magnifications of the images of the light sources formed through the imaging lens vary with the emission wavelength regions and the figures and sizes of the light-emitting sections in the light sources.

In the microscope illumination apparatus of the present invention, it is desirable that one of the at least three kinds of light sources is a light source emitting light of wavelength in an ultraviolet wavelength region, and the light source emitting light of wavelength in the ultraviolet wavelength region and the collimator lens corresponding to this light source are arranged so that an optical path length from the light source emitting light of wavelength in the ultraviolet wavelength region to the entrance end face of the optical fiber is shorter than that from any of remaining light sources to the entrance end face of the optical fiber.

In the microscope illumination apparatus of the present invention, it is desirable that the path sharing means is constructed with dichroic mirrors, each located at a position where two optical paths cross.

In the microscope illumination apparatus of the present invention, it is desirable that each of the dichroic mirrors is constructed to be movable in and out of a position where the two optical paths cross, including an optical path for light from each of light sources used for illumination light, of the at least three kinds of light sources.

In the microscope illumination apparatus of the present invention, it is desirable that the path sharing means is a turret in which the at least three kinds of light sources and corresponding collimator lenses are held, and by rotation about a center axis, optical axes of each of the light sources and each of the corresponding collimator lenses can be aligned with the optical axis of the imaging lens during a predetermined time interval.

In the microscope illumination apparatus of the present invention, it is desirable that the path sharing means is mirrors, each movable to and out of a position where the two optical paths cross, including an optical path for light from each of light sources used for illumination light, of the at least three kinds of light sources.

According to the microscope illumination apparatus of the present invention, the loss of the amount of light is kept to a minimum and the light can be efficiently supplied to the microscope body, even in the case of light emitted from any of at least three kinds of light sources, each of a different emission wavelength region and a different figure and size of the light-emitting section, notably at least three kinds of light sources including a light source using an ultraviolet wavelength region as the emission wavelength.

These and other features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, the function and effect of the present invention will be explained.

FIGS. 2A-2E show general relationships between the optical fiber and the incident light as a preliminary knowledge for explaining a fundamental conception in the microscope illumination apparatus of the present invention.

Figure 1:
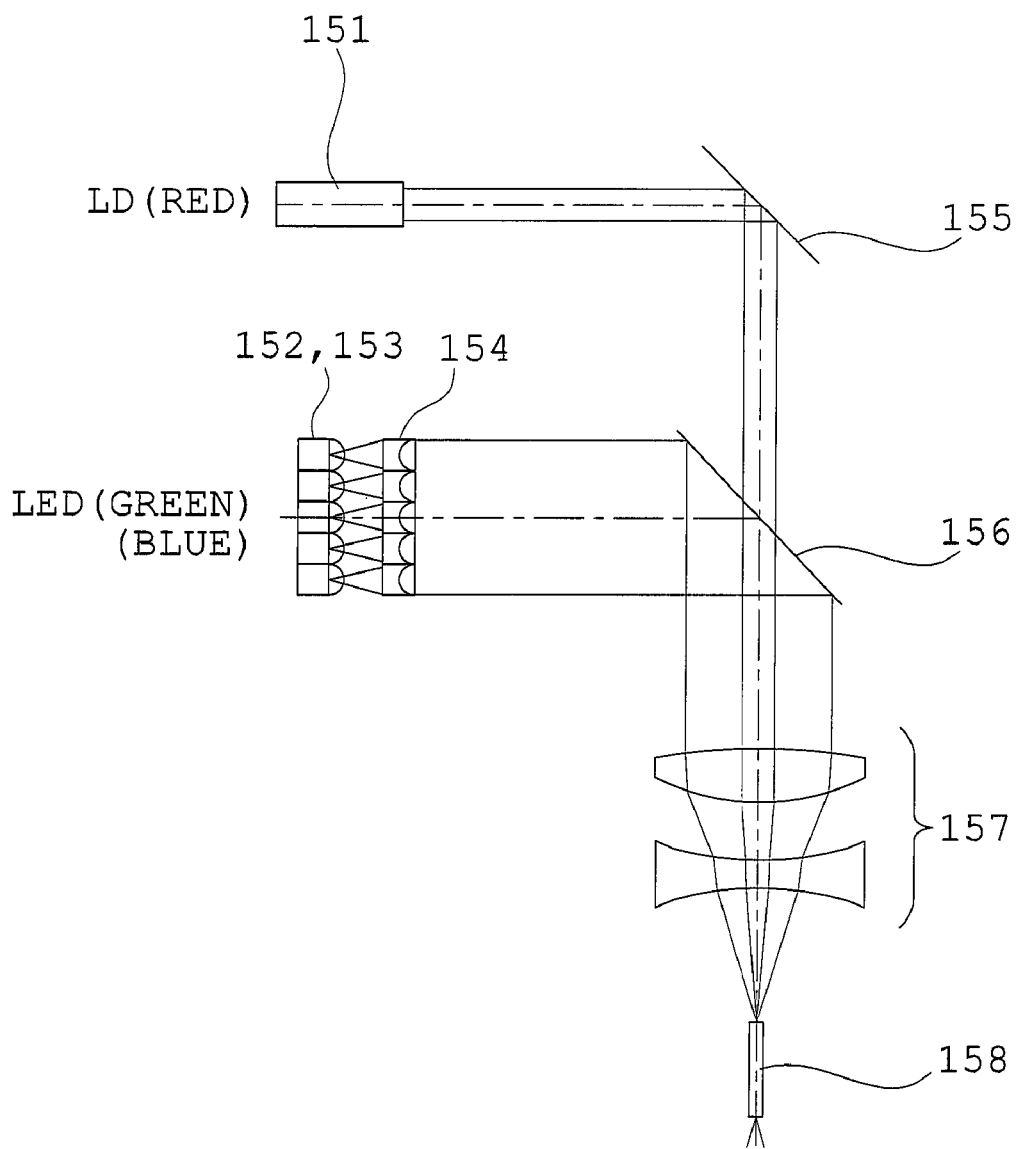
FIG. 1 is an explanatory view showing essential parts of one structural example of the microscope illumination apparatus set forth in Kokai No. 2005-10296.
Figure 2A:
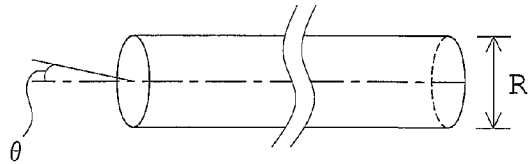
FIG. 2A is an explanatory view showing the entrance end face and the critical angle of an optical fiber.

As shown in FIG. 2A, the minimum angle (a critical angle) at which light from a light source having a preset emission wavelength region is totally reflected by the optical fiber with a core diameter of R is denoted by $\theta$. In this case, of rays of light emitted from the light source, a ray corresponding to an angle of incidence smaller than the angle $\theta$ is incident on the optical fiber.

On the other hand, a figure and size L of the light-emitting section and an angle of divergence $\phi$ in the light source are determined in accordance with the emission wavelength region of the light source.

Figure 2B:
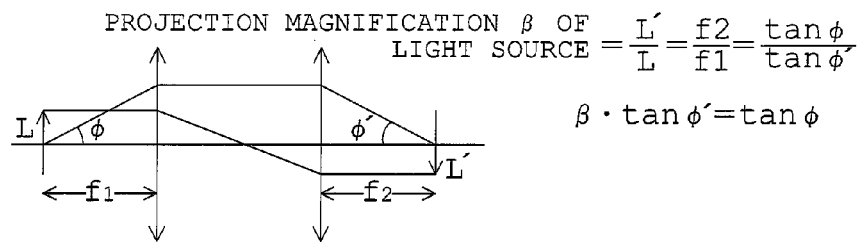
FIG. 2B is an explanatory view showing a projection magnification of a light source at the entrance end face of the optical fiber, using the size of the light source, an angle of direction, an angle of incidence of light on the entrance end face of the optical fiber, and the size of the image of the light source.

Here, as shown in FIG. 2B, when a front focal distance of an optical system in which the image of the light source is formed on the entrance end face of the optical fiber by the incidence of the light from the light source is denoted by f1; a back focal distance, by f2; an angle of incidence of a ray of light on the entrance end face of the optical fiber, by $\phi'$; and a size of the image of the light source at the entrance end face of the optical fiber, by L', a projection magnification $\beta$ of the light source of the size L at the entrance end face of the optical fiber brings about the following relations:

$$\beta = L'/L = f2/f1 = \tan\phi/\tan\phi'$$

$$\beta \cdot \tan\phi' = \tan\phi$$

Here, the angle of divergence $\phi$ is governed by the emission wavelength region of the light source and thus the value of $\tan\phi$ is fixed.

Hence, when the magnification $\beta$ is increased, $\tan\phi'$ reduces, while when $\tan\phi'$ is increased, the magnification $\beta$ reduces.

Figure 2C:
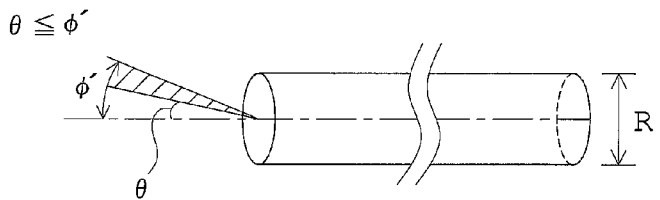
FIG. 2C is an explanatory view showing a state where the projection magnification of the light source is so low that the angle of incidence on the entrance end face of the optical fiber exceeds, the critical angle of the optical fiber.

However, when the projection magnification $\beta$ of the light source is decreased, the angle of incidence $\phi'$ increases, but when the projection magnification $\beta$ is made so high that the angle of incidence $\phi'$ exceeds the critical angle $\theta$ of the optical fiber, as shown in FIG. 2C, a ray corresponding to the angle of incidence exceeding the critical angle $\theta$ of the optical fiber (indicated by hatching in FIG. 2C), of rays incident on the entrance end face of the optical fiber, is not incident on the optical fiber.

Figure 2D:
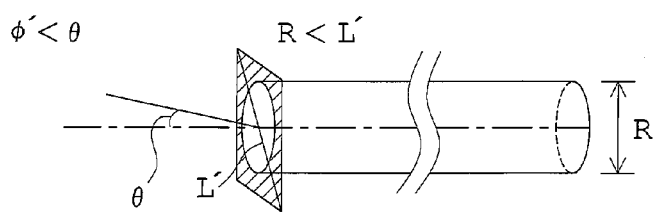
FIG. 2D is an explanatory view showing a state where even when the angle of incidence on the entrance end face of the optical fiber is made smaller than the critical angle of the optical fiber, the projection magnification of the light source is so high that the size of the image of the light source is larger than the core diameter of the optical fiber.

On the other hand, even though the angle of incidence $\phi'$ is set to become smaller than the critical angle $\theta$ of the optical fiber, when the image L' of the light source projected on the entrance end face of the optical fiber at the magnification $\beta$ is larger than the core diameter R of the optical fiber, as shown in FIG. 2D, a ray corresponding to an image portion larger than the core diameter R of the optical fiber (indicated by hatching in FIG. 2D), of rays incident on the entrance end face of the optical fiber, is not incident on the optical fiber.

Moreover, when the emission wavelength of the light source varies, the critical angle $\theta$ of the optical fiber varies with the wavelength to be incident.

Figure 2E:
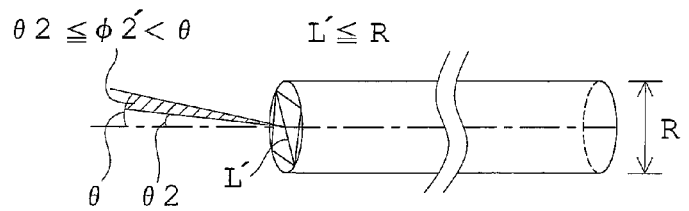
FIG. 2E is an explanatory view showing a state that when the light source of the emission wavelength different from that of each of FIGS. 2A-2D is used, the angle of incidence on the entrance end face of the optical fiber is smaller than the critical angle of the optical fiber where the light source of each of FIGS. 2A-2D is used, but exceeds the critical angle of the optical fiber where the light source of the emission wavelength different from that of each of FIGS. 2A-2D is used.

Consequently, even though another light source (whose size is denoted here by L2) having the emission wavelength and the size and figure of the light-emitting section that are different from those of the light source of FIG. 2B is set so that the angle of incidence of the ray on the entrance end face of the optical fiber is smaller than the critical angle $\theta$ of the optical fiber and the image of the light source is below the core diameter R of the optical fiber, when an angle of incidence $\phi2'$ of a ray on the entrance end face of the optical fiber, as shown in FIG. 2E, exceeds a critical angle $\theta2$ of the optical fiber, a ray corresponding to the angle of incidence exceeding the critical angle $\theta2$ of the optical fiber are not incident on the optical fiber.

However, in view of these respects, the present invention is designed so that all rays of light emitted from any of at least three kinds of light sources, each of a different emission wavelength region and a different size and figure of the light-emitting section, are capable of being incident on the entrance end face of the optical fiber.

Figure 3:
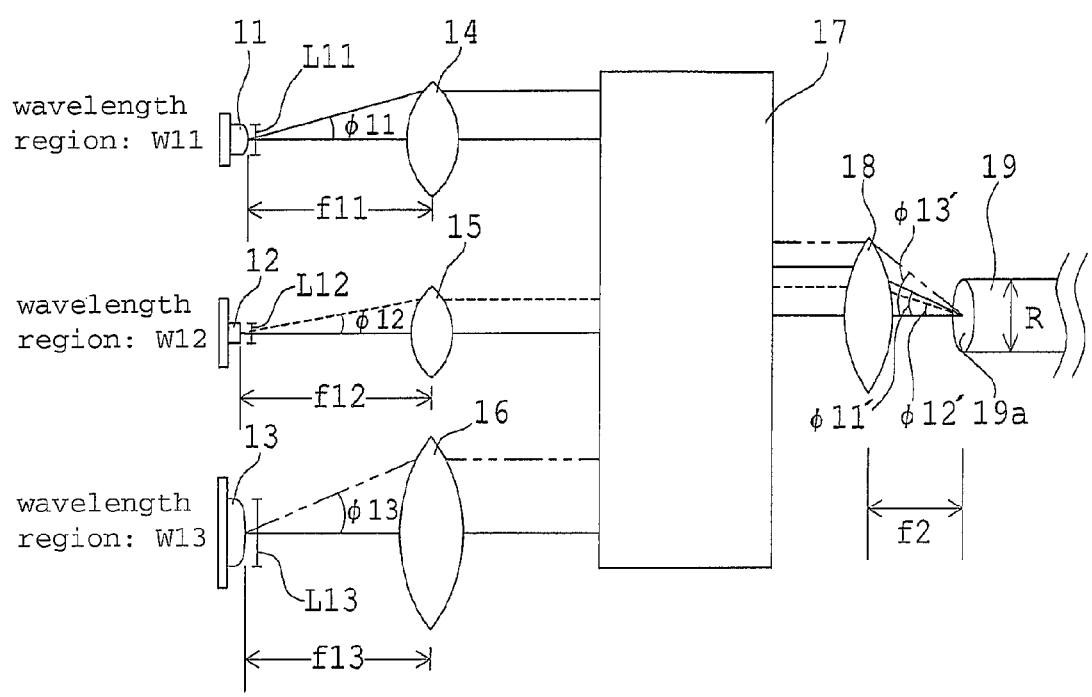
FIG. 3 is a conceptual view showing a fundamental structure of the microscope illumination apparatus of the present invention.
Figure 4A:
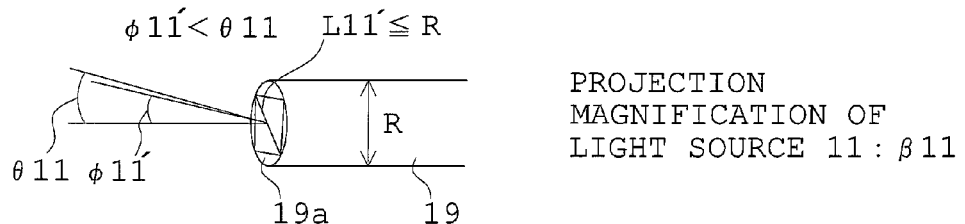
FIGS. 4A, 4B, and 4C are explanatory views showing states where light from a first light source, a second light source, and a third light source, respectively, is incident on the entrance end face of the optical fiber.
Figure 4B:
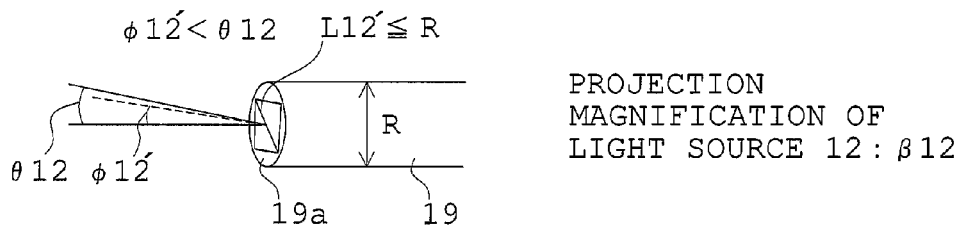
Figure 4C:
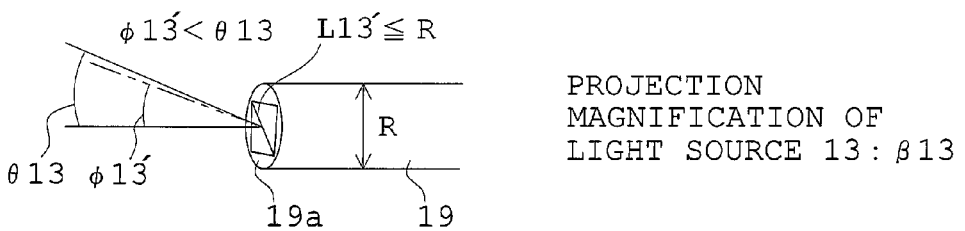

FIG. 3 shows a fundamental structure of the microscope illumination apparatus of the present invention. FIGS. 4A-4C each show an angle of incidence of a ray of light on the entrance end face of the optical fiber and the size of the image of the light source in the microscope illumination apparatus of FIG. 3.

The microscope illumination apparatus of the present invention has light sources 11, 12, and 13; collimator lenses 14, 15, and 16; a path sharing means 17; an imaging lens 18; and an optical fiber 19.

Each of the light sources 11, 12, and 13 has a different emission wavelength region and a different shape and size of the light-emitting section. Also, for convenience, the structures of the apparatus having three kinds of light sources are described here, but four or more kinds of light sources may be used.

The collimator lenses 14, 15, and 16 are arranged on the exit sides of the light sources 11, 12, and 13, respectively, and are constructed so that incident rays from the light sources 11, 12, and 13 are converted into parallel rays.

The path sharing means 17 is constructed so that light emerging from the collimator lenses 14, 15, and 16 is introduced into a common optical path.

The imaging lens 18 is constructed so that the images of the light sources 11, 12, and 13 introduced into the common optical path through the path sharing means 17 are formed at a common position.

The optical fiber 19 is placed so that its entrance end face 19a is located at a position where the images of the light sources 11, 12, and 13 are formed through the imaging lens 18.

The collimator lenses 14, 15, and 16 are further constructed to have optical properties varying with the emission wavelength regions and the figures and sizes of the light-emitting sections in the light sources 11, 12, and 13 so that an angle of incidence of light emitted from each of the corresponding light sources 11, 12, and 13 on the optical fiber 19 through the imaging lens 18 is smaller than the critical angle of the optical fiber 19 and the image of the light source formed through the imaging lens 18 has the maximum size to such an extent that the image is not larger than the entrance end face 19a of the optical fiber 19.

This construction can be provided using relational expressions as described below.

The core diameter of the optical fiber 19 is represented by R and the focal length of the imaging lens 18 is represented by f2.

In the light source 11, the emission wavelength region is denoted by W11; the size of the light-emitting section, by L11; the angle of divergence, by $\phi 11$; the focal length of the collimator lens 14, by f11; the angle of incidence of a ray on the entrance end face 19a of the optical fiber 19, by $\phi 11'$; the critical angle of the optical fiber 19 relative to light of the emission wavelength region W11, by $\theta 11$; the size of the image of the light source 11 projected on the entrance end face 19a of the optical fiber 19 through the collimator lens 14 and the imaging lens 18, by L11'; and the projection magnification, by $\beta 11$.

With respect to the light source 12, the emission wavelength region is denoted by W12; the size of the light-emitting section, by L12; the angle of divergence, by $\phi 12$; the focal length of the collimator lens 15, by f12; the angle of incidence of a ray on the entrance end face 19a of the optical fiber 19, by $\phi 12'$; the critical angle of the optical fiber 19 relative to light of the emission wavelength region W12, by $\theta 12$; the size of the image of the light source 12 projected on the entrance end face 19a of the optical fiber 19 through the collimator lens 15 and the imaging lens 18, by L12'; and the projection magnification, by $\beta 12$.

As for the light source 13, the emission wavelength region is denoted by W13; the size of the light-emitting section, by L13; the angle of divergence, by $\phi 13$; the focal length of the collimator lens 16, by f13; the angle of incidence of a ray on the entrance end face 19a of the optical fiber 19, by $\phi 13'$; the critical angle of the optical fiber 19 relative to light of the emission wavelength region W13, by $\theta 13$; the size of the image of the light source 13 projected on the entrance end face 19a of the optical fiber 19 through the collimator lens 16 and the imaging lens 18, by L13'; and the projection magnification, by $\beta 13$.

In this case, in the microscope illumination apparatus of the present invention, the collimator lenses 14, 15, and 16 are individually constructed so as to satisfy all the following conditions:

$$\phi 11' < \theta 11 \tag{1}$$

$$L11' \leq R \tag{2}$$

$$\phi 12' < \theta 12 \tag{3}$$

$$L12' \leq R \tag{4}$$

$$\phi 13' < \theta 13 \tag{5}$$

$$L13' \leq R \tag{6}$$

where $\beta 11 = L11'/L11 = f2/f11 = \tan \phi 11/\tan \phi 11'$
$\beta 12 = L12'/L12 = f2/f12 = \tan \phi 12/\tan \phi 12'$
$\beta 13 = L13'/L13 = f2/f13 = \tan \phi 13/\tan \phi 13'$ By doing so, light emitted from the light sources 11, 12, and 13, each of a different emission wavelength region and a different size and shape of the light-emitting section, is formed as the largest possible image and can be rendered incident, without undergoing total reflection, on the entrance end face 19a of the optical fiber 19. Consequently, it is possible to obtain the microscope illumination apparatus in which the loss of the amount of light is kept to a minimum and light is efficiently supplied to the microscope body.

Also, light of different wavelengths emitted from the light sources 11, 12, and 13, incident on the entrance end face 19a of the optical fiber 19, passes through the optical fiber 19 and thereby the wavelength distribution of the light is uniformed.

It is desirable that when the shapes and sizes L11, L12, and L13 of the light-emitting sections vary with the emission wavelength region, the projection magnifications $\beta 11$, $\beta 12$, and $\beta 13$ are set to vary as well.

By doing so, the images of the light sources 11, 12, and 13 can be formed to have alts the same size on the entrance end face 19a of the optical fiber 19 and the wavelength distribution of illumination light can be made further uniform.

Also, it is desirable that when one of the at least three kinds of light sources 11, 12, and 13 is a light source emitting light of wavelength in an ultraviolet wavelength region, the light source emitting light of wavelength in the ultraviolet wavelength region and a corresponding collimator lens are arranged so that an optical path length from the light source emitting light of wavelength in the ultraviolet wavelength region to the entrance end face of the optical fiber 19 is shorter than that from any other light source to the entrance end face of the optical fiber 19.

By doing so, in addition to the above effect, an optical member transmitting light of ultraviolet wavelength can be set to the smallest possible size and the loss of the ultraviolet wavelength can be kept to a minimum.

Also, it is recommended that the path sharing means 17 is constructed with dichroic mirrors, each located at the position where two optical paths cross.

In this case, each of the dichroic mirrors can be fixedly located at the position where two optical paths cross through which light from the at least three kinds of light sources 11, 12, and 13 travels.

Further, each dichroic minor may be constructed to be movable in and out of a position where the two optical paths cross, including an optical path for light from each of light sources used for illumination light, of the at least three kinds of light sources 11, 12, and 13.

Alternatively, the path sharing means 17 may be constructed with a turret in which the at least three kinds of light sources 11, 12, and 13 and the corresponding collimator lenses 14, 15, and 16 are held, and by rotation about a center axis, optical axes of each of the light sources 11, 12, and 13 and each of the corresponding collimator lenses 14, 15, and 16 can be aligned with the optical axis of the imaging lens 18 during a predetermined time interval.

Further, the path sharing means 17 may be constructed with mirrors, each movable to and out of a position where the two optical paths cross, including an optical path for light from each of light sources used for illumination light, of the at least three kinds of light sources 11, 12, and 13.

First Embodiment

Figure 5:
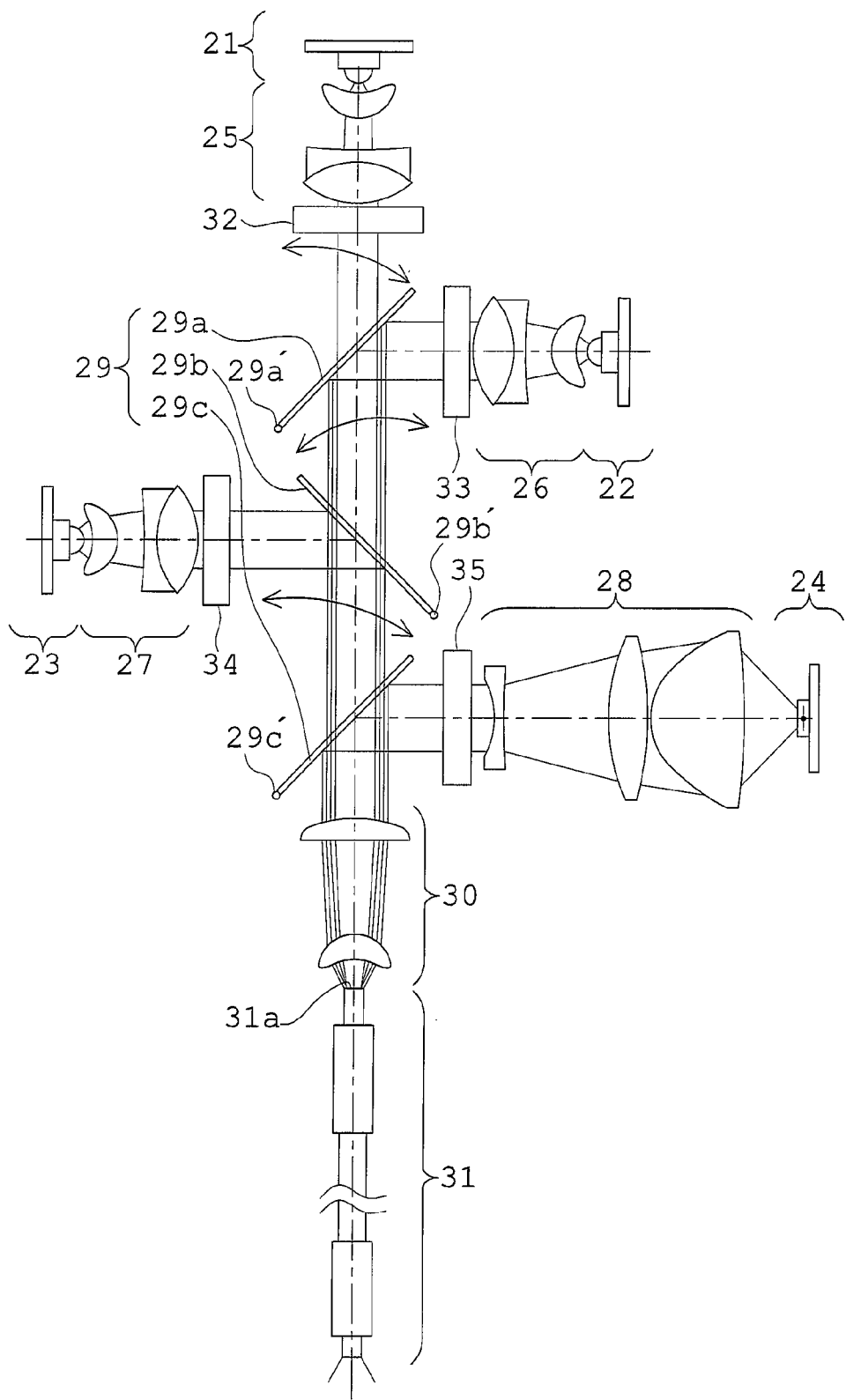
FIG. 5 is a schematic view illustrating the microscope illumination apparatus of a first embodiment in the present invention.

FIG. 5 shows the microscope illumination apparatus of the first embodiment in the present invention.

The microscope illumination apparatus of the first embodiment has light sources 21, 22, 23, and 24; collimator lenses 25, 26, 27, and 28; a path sharing means 29; an imaging lens 30; and an optical fiber 31. Also, in FIG. 5, reference numerals 32-35 denote plane-parallel plates such as filters.

The light source 21 is constructed with a red LED. The light source 22 is constructed with a green LED. The light source 23 is constructed with a blue LED. The light source 24 is constructed with an ultraviolet LED. Each of the light sources 21-24 has a different figure and size of the light-emitting section.

The collimator lenses 25, 26, 27, and 28 are arranged on the exit sides of the light sources 21, 22, 23, and 24, respectively, and are constructed so that incident rays from the light sources 21, 22, 23, and 24 are converted into parallel rays.

The path sharing means 29 includes dichroic mirrors 29a, 29b, and 29c. The dichroic mirror 29a is located at a position where an optical path from the light source 21 intersects with that from the light source 22 so that light from the light source 21 is transmitted and light from the light source 22 is reflected. The dichroic mirror 29b is located at a position where an optical path shared though the dichroic mirror 29a intersects with an optical path from the light source 23 so that light from the light sources 21 and 22 is transmitted and light from the light source 23 is reflected. The dichroic mirror 29c is located at a position where an optical path shared through the dichroic mirror 29b intersects with an optical path from the light source 24 so that light from the light sources 21, 22, and 23 is transmitted and light from the light source 24 is reflected.

The imaging lens 30 is constructed so that the images of the light sources 21, 22, 23, and 24 introduced into a common optical path through the path sharing means 29 are formed at a common position.

The optical fiber 31 is placed so that its entrance end face 31a is located at a position where the images of the light sources 21, 22, 23, and 24 are formed through the imaging lens 30.

The collimator lenses 25, 26, 27, and 28 are further constructed to have optical properties varying with the emission wavelength regions and the figures and sizes of the light-emitting sections in the light sources 21, 22, 23, and 24 so that an angle of incidence of light emitted from each of the corresponding light sources 21, 22, 23, and 24 on the optical fiber 31 through the imaging lens 30 is smaller than the critical angle of the optical fiber 31 and each of the images of the light sources formed through the imaging lens 30 has the maximum size to such an extent that the image is not larger than the entrance end face 31a of the optical fiber 31.

Specifically, here, the core diameter of the optical fiber 31 is taken as R and the focal length of the imaging lens 30 is taken as f2.

In the light source 21, the emission wavelength region is denoted by W21; the size of the light-emitting section, by L21; the angle of divergence, by $\phi$21; the focal length of the collimator lens 25, by f21; the angle of incidence of a ray on the entrance end face 31a of the optical fiber 31, by $\phi$21'; the critical angle of the optical fiber 31 relative to light of the emission wavelength region W21, by $\theta$21; the size of the image of the light source 21 projected on the entrance end face 31a of the optical fiber 31 through the collimator lens 25 and the imaging lens 30, by L21'; and the projection magnification, by $\beta$21.

With respect to the light source 22, the emission wavelength region is denoted by W22; the size of the light-emitting section, by L22; the angle of divergence, by $\phi$22; the focal length of the collimator lens 26, by f22; the angle of incidence of a ray on the entrance end face 31a of the optical fiber 31, by $\phi$22'; the critical angle of the optical fiber 31 relative to light of the emission wavelength region W22, by $\theta$22; the size of the image of the light source 22 projected on the entrance end face 31a of the optical fiber 31 through the collimator lens 26 and the imaging lens 30, by L22'; and the projection magnification, by $\beta$22.

As for the light source 23, the emission wavelength region is denoted by W23; the size of the light-emitting section, by L23; the angle of divergence, by $\phi$23; the focal length of the collimator lens 27, by f23; the angle of incidence of a ray on the entrance end face 31a of the optical fiber 31, by $\phi$23'; the critical angle of the optical fiber 31 relative to light of the emission wavelength region W23, by 023; the size of the image of the light source 23 projected on the entrance end face 31a of the optical fiber 31 through the collimator lens 27 and the imaging lens 30, by L23'; and the projection magnification, by $\beta$23.

In the light source 24, the emission wavelength region is denoted by W24; the size of the light-emitting section, by L24; the angle of divergence, by $\phi$24; the focal length of the collimator lens 28, by f24; the angle of incidence of a ray on the entrance end face 31a of the optical fiber 31, by $\phi$24'; the critical angle of the optical fiber 31 relative to light of the emission wavelength region W24, by 024; the size of the image of the light source 24 projected on the entrance end face 31a of the optical fiber 31 through the collimator lens 28 and the imaging lens 30, by L24'; and the projection magnification, by $\beta$24.

In this case, in the microscope illumination apparatus of the first embodiment, the collimator lenses 25, 26, 27, and 28 are individually constructed so as to satisfy all the following conditions:

$$\phi 21' < \theta 21 \quad (1')$$

$$L21' \leq R \quad (2')$$

$$\phi 22' < \theta 22 \quad (3')$$

$$L22' \leq R \quad (4')$$

$$\phi 23' < \theta 23 \quad (5')$$

$$L23' \leq R \quad (6')$$

$$\phi 24' < \theta 24 \quad (7')$$

$$L24' \leq R \quad (8')$$

where
$\beta 21 = L21'/L21 = f2/f21 = \tan \phi 21/\tan \phi 21'$
$\beta 22 = L22'/L22 = f2/f22 = \tan \phi 22/\tan \phi 22'$
$\beta 23 = L23'/L23 = f2/f23 = \tan 100\ 23/\tan \phi 23'$
$\beta 24 = L24'/L24 = f2/f24 = \tan \phi 24/\tan \phi 24'$ In the microscope illumination apparatus of the first embodiment, the figures and sizes L21, L22, L23, and L24 vary with the emission wavelength region, and the projection magnifications β21, β22, β23, and β24 vary as well.

The light source 24 emitting light of wavelength in the ultraviolet wavelength region and the corresponding collimator lens 28 are arranged so that an optical path length from the light source 24 emitting light of wavelength in the ultraviolet wavelength region to the entrance end face 31a of the optical fiber 31 is shorter than that from any of the other light sources 21, 22, and 23 to the entrance end face 31a of the optical fiber 31.

In addition, light incident from the light sources 21, 22, 23, and 24 on the optical fiber 31 can be supplied, as illumination light for observing a specimen, to the microscope body through a projection optical system, not shown.

In the microscope illumination apparatus of the first embodiment constructed as mentioned above, light emitted from the light sources 21, 22, 23, and 24 is converted into parallel rays through the corresponding collimator lenses 25, 26, 27, and 28, and is incident on the corresponding dichroic mirrors 29a, 29b, and 29c. The light is deflected toward the imaging lens 30 through the dichroic mirrors 29a, 29b, and 29c and travels through the common optical path so that the images of the light sources 21, 22, 23, and 24 are formed on the entrance end face 31a of the optical fiber 31 through the imaging lens 30. The light travels through the optical fiber 31 to thereby make wavelength distribution uniform and is supplied to the microscope body through the projection optical system, not shown.

In this case, according to the microscope illumination apparatus of the first embodiment, the collimator lenses 25, 26, 27, and 28 satisfy Conditions (1')-(8'), and thus light emitted from the light sources 21, 22, 23, and 24, each of a different emission wavelength region and a different size and shape of the light-emitting section, can be made incident, without undergoing total reflection, on the entrance end face 31a of the optical fiber 31 by forming the larger images. Consequently, it is possible to obtain the microscope illumination apparatus in which the loss of the amount of light is kept to a minimum and light is efficiently supplied to the microscope body.

In the microscope illumination apparatus of the first embodiment, since the projection magnifications β21, β22, β23, and β24 are made different from one another, the images from the light sources 21, 22, 23, and 24 can be formed to have nearly the same size on the entrance end face 31a of the optical fiber 31 and the wavelength distribution of illumination light can be made further uniform.

Moreover, in the microscope illumination apparatus of the first embodiment, since the light source 24 emitting light of wavelength in the ultraviolet wavelength region and the corresponding collimator lens 28 are arranged so that an optical path length from the light source 24 emitting light of wavelength in the ultraviolet wavelength region to the entrance end face 31a of the optical fiber 31 is shorter than that from any of the other light sources 21, 22, and 23 to the entrance end face 31a of the optical fiber 31, an optical member transmitting light of ultraviolet wavelength can be set to the smallest possible size and the loss of the ultraviolet wavelength can be kept to a minimum.

Also, in the microscope illumination apparatus of the first embodiment, an fixed arrangement of the dichroic mirrors 29a, 29b, and 29c will suffice, but the apparatus may be constructed so that the dichroic mirrors 29a, 29b, and 29c can be rotated about center axes 29a', 29b', and 29c', respectively, in directions of arrows and thereby are each movable in and out of the position where two optical paths cross.

In this way, by inserting and removing the dichroic mirrors in and out of the optical path, it is possible to select a light source used, except the light source 24, in a state where all the light sources are turned on.

Instead of the dichroic mirrors 29a, 29b, and 29c, mirrors which can be rotated about the center axes 29a', 29b', and 29c' in directions of arrows and thereby are each movable in and out of the position where two optical paths cross may be used.

In the case where the apparatus is constructed as mentioned above, it is possible to select a light source used in a state where the all the light sources are turned on, by inserting and removing the mirrors in and out of the optical path. When the light sources 22, 23, and 24 are used, the light source 21 may need to be turned off in accordance with its application.

Also, although in this case one kind of light source can be selected by the mirrors, observation images of a plurality of kinds of fluorescent wavelengths can be obtained by superimposing an image picked up by an image sensor in the microscope body, not shown, on an image where a different light source is selected.

Also, in the microscope illumination apparatus of the first embodiment, LEDs have been used as the light sources, but LDs, gas lasers (such as Ar or HeNe), xenon, halogen, metal halide, mercury, and mercury xenon are applicable, in addition to the LEDs, to the light sources of the microscope illumination apparatus of the present invention.

Second Embodiment

Figure 6:
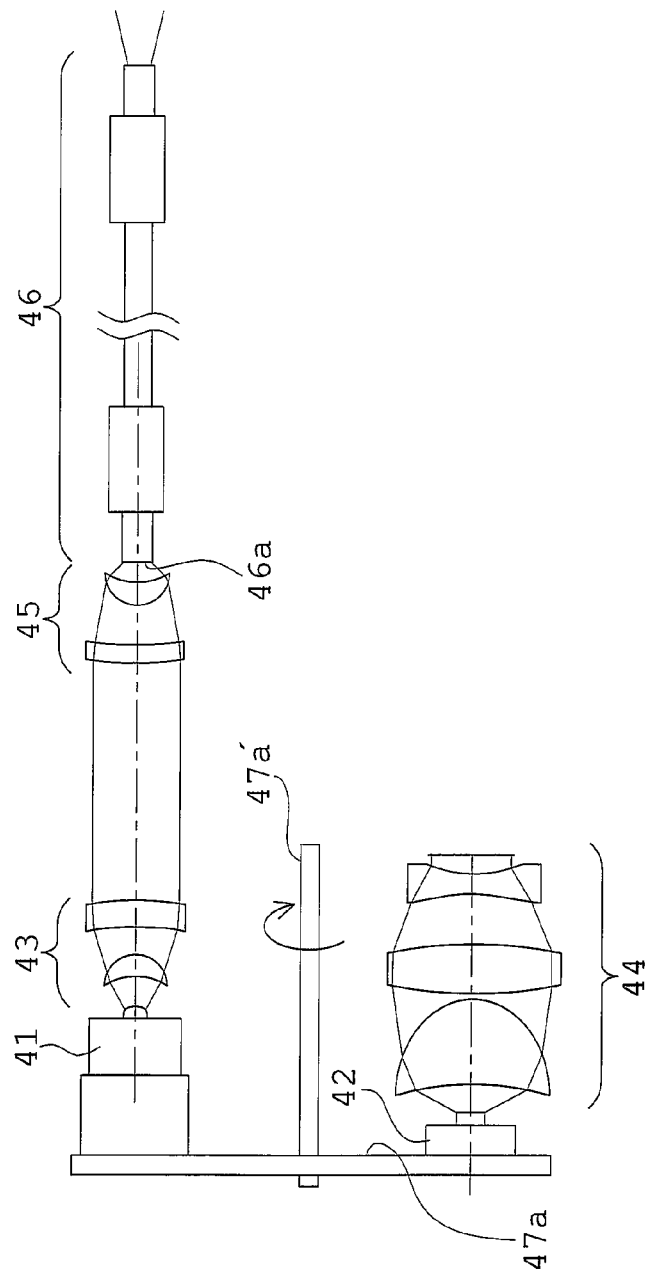
FIG. 6 is a schematic view illustrating essential parts of the microscope illumination apparatus of a second embodiment in the present invention.

FIG. 6 shows essential parts of the microscope illumination apparatus of the second embodiment in the present invention.

Also, in FIG. 6, reference numerals 41 and 42 represent light sources equivalent to the light sources 21, 22, 23, and 24 of FIGS. 5 and 43 and 44 represent collimator lenses equivalent to the collimator lenses 25, 26, 27, and 28 of FIG. 5. Reference numeral 45 denotes an imaging lens equivalent to the imaging lens 30 of FIGS. 5 and 46 denotes an optical fiber equivalent to the optical fiber 31 of FIG. 5.

In the microscope illumination apparatus of the second embodiment, a path sharing means 47 is constructed with a turret 47a.

In the turret 47a, a combination of three kinds of light sources, each of a different emission wavelength region and a different figure and size of the light-emitting section, with the collimator lenses arranged on the exit sides of the light sources is concentrically provided and retained. Also, in FIG.

6, for convenience, two kinds of light sources 41 and 42 and the corresponding collimator lenses 43 and 44 are shown and another kind of light source and another collimator lens are omitted from the figure.

The turret 47a is constructed so that it is rotated about a center axis 47a' through an electric rotary driving mechanism, not shown, and thereby the optical axis of a combination of each of three kinds of light sources with the collimator lens placed on the exit side of each light source can be aligned with the optical axis of the imaging lens 45 during a predetermined time interval.

Other structural features are almost the same as in the microscope illumination apparatus of FIG. 5.

According to the microscope illumination apparatus of the second embodiment constructed as mentioned above, there is no need to provide the dichroic mirrors or mirrors on the optical paths from the light sources to the optical fiber and in addition, the optical path length can be reduced. As such, the loss of the amount of light can be decreased accordingly and space can be saved, with the result that a compact design of the entire microscope illumination apparatus can be attained.

Other functions and effects are almost the same as in the microscope illumination apparatus of the first embodiment.

Third Embodiment

Figure 7:
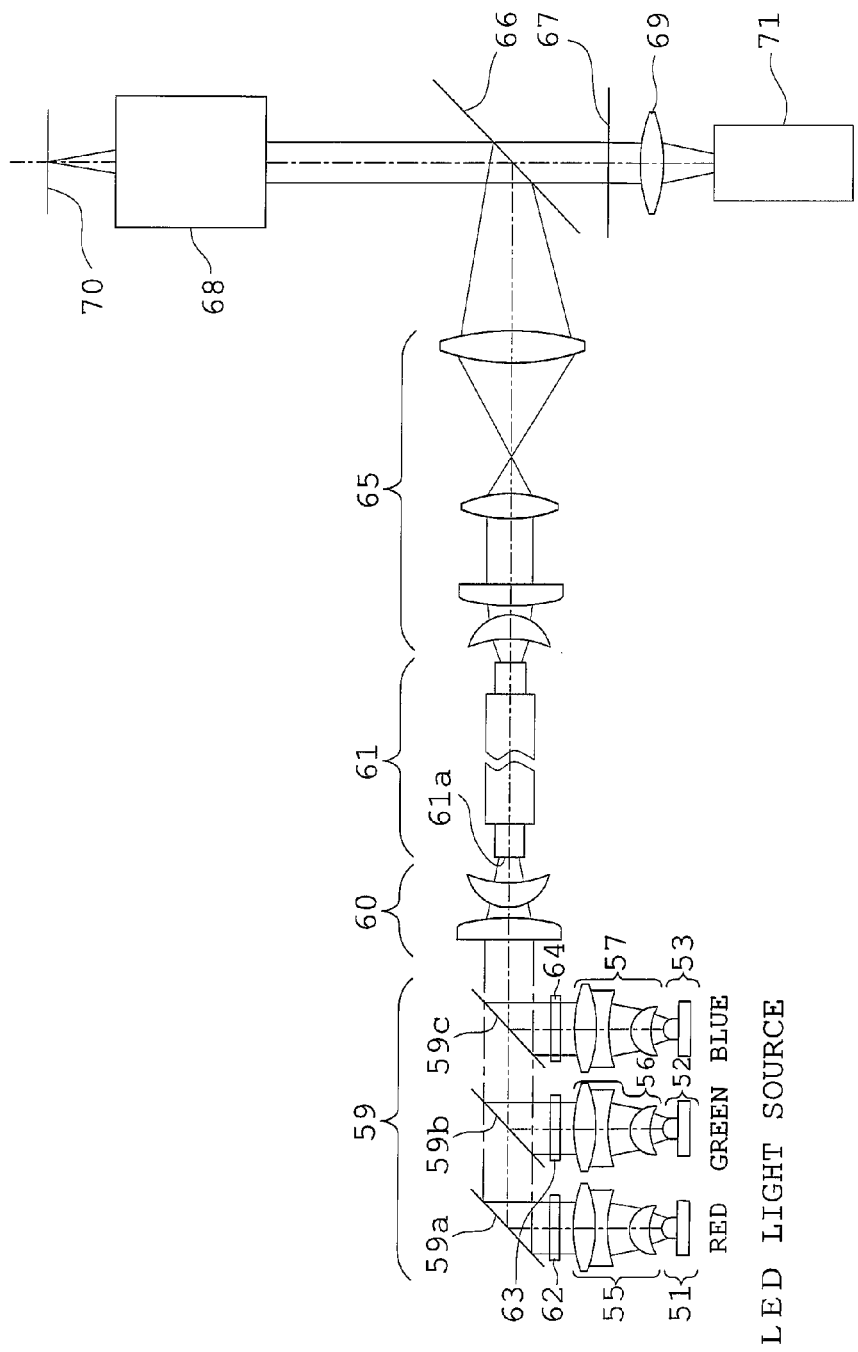
FIG. 7 is a schematic view illustrating a microscope equipped with the microscope illumination apparatus of a third embodiment in the present invention.

FIG. 7 shows a microscope equipped with the microscope illumination apparatus of the third embodiment in the present invention.

The microscope illumination apparatus of the third embodiment has three kinds of LED light sources 51, 52, and 53; collimator lenses 55, 56, and 57; a path sharing means 59; an imaging lens 60; an optical fiber 61; and excitation filters 62, 63, and 64. Also, in FIG. 7, reference numeral 65 represents a projection lens system; 66, a dichroic mirror; 67, an absorption filter; 68, an objective lens; 69, an imaging lens; 70, a specimen surface; and 71, a CCD.

The LED light sources 51, 52, and 53 are equivalent to the light sources 21, 22 and 23 in FIG. 5. They are constructed with a red LED for the LED light source 51, a green LED for the LED light source 52, and a blue LED for the LED light source 53.

The collimator lenses 55, 56, and 57 are equivalent to the collimator lenses 25, 26, and 27 in FIG. 5. The collimator lenses 55, 56, and 57 are constructed so that incident rays from the LED light sources 51, 52, and 53 are converted into parallel rays. The excitation filters 62, 63, and 64 are equivalent to the plane-parallel plates such as filters in FIG. 5. The excitation filters 62, 63, and 64 have characteristics that only light of particular wavelengths emitted from the LED light sources 51, 52, and 53 is transmitted.

The path sharing means 59 is constructed with dichroic mirrors 59a, 59b, and 59c, which are located at positions where optical axes of light emitted from the LED light sources 51, 52, and 53 intersect with the center axis of the imaging lens 60. The dichroic mirrors 59b and 59c are equivalent to the dichroic mirrors 29a and 29b of FIG. 5. The dichroic mirror 59a reflects light from the LED light source 51 (the red LED). The dichroic mirror 59b reflects light from the LED light source 52 (the green LED) and transmits light from the LED light source 51 (the red LED). The dichroic minor 59c reflects light from the LED light source 53 (the blue LED) and transmits light from the LED light sources 51 and 52 (the red LED and the green LED).

The imaging lens 60 is equivalent to the imaging lens 30 of FIG. 5. The imaging lens 60 is constructed so that images of the LED light sources 51, 52, and 53 introduced into a common optical path through the path sharing means 59 are formed at a common position.

The optical fiber 61 is equivalent to the optical fiber 31 of FIG. 5. The optical fiber 61 is placed so that its entrance end face 61a is located at a position where the images of the LED light sources 51, 52, and 53 are formed through the imaging lens 60. In the microscope illumination apparatus of the third embodiment as well, the collimator lenses 59a, 59b, and 59c, as in the microscope illumination apparatus of the first embodiment, is constructed to have optical properties varying with the emission wavelength regions and the figures and sizes of the light-emitting sections in the LED light sources 51, 52, and 53 so that an angle of incidence of light emitted from each of the corresponding LED light sources 51, 52, and 53 on the optical fiber 61 through the imaging lens 60 is smaller than the critical angle of the optical fiber 61 and each of the images of the light sources formed through the imaging lens 60 has the maximum size to such an extent that the image is not larger than the entrance end face 61a of the optical fiber 61.

Other structural features of the microscope illumination apparatus are almost the same as in the microscope illumination apparatus of FIG. 5.

In the microscope equipped with the microscope illumination apparatus of the third embodiment, light from the microscope illumination apparatus follows paths as described below.

Light passing through the optical fiber 61 and transmitted is incident on the dichroic minor 66 through the projection lens system 65.

The dichroic mirror 66 includes a plurality of dichroic minors, each of a different transmission characteristic, so that all of light emitted from one, two, or all of the red LED light source 51, the green LED light source 52, and the blue LED light source 53 is reflected, and is constructed so that the dichroic mirror is switched to a desired dichroic mirror of these dichroic mirrors and can be used.

The light reflected by the dichroic mirror 66 irradiates the specimen surface 70 through the objective lens 68. The light from the specimen surface 70 passes through the objective lens 68 and is incident on the absorption filter 67. The absorption filter 67 transmits fluorescent light, of incident light, and absorbs remaining light. The fluorescent light transmitted through the absorption filter 67 is imaged through the imaging lens 69 and is picked up by the CCD 71.

When multiple staining of cells is performed with a microscope using a conventional microscope illumination apparatus, it is necessary to provide the excitation filter of at least a double band ahead of the dichroic mirror because if the light source used for illumination is a xenon or mercury light source, it will contain light covering a wide range of wavelengths.

According to the microscope illumination apparatus of the third embodiment, however, the excitation filters 62, 63, and 64 are provided in the light source sections, and thus there is no need to place the excitation filter ahead of the dichroic mirror 66.

When the dichroic mirrors in which all of light emitted from all of the red LED light source 51, the green LED light source 52, and the blue LED light source 53 is reflected are used as the dichroic mirror 66, doubly- or multiply-stained cells can be easily observed.

Other functions and effects of the microscope illumination apparatus are almost the same as in the microscope illumination apparatus of the first embodiment.

Fourth Embodiment

Figure 8:
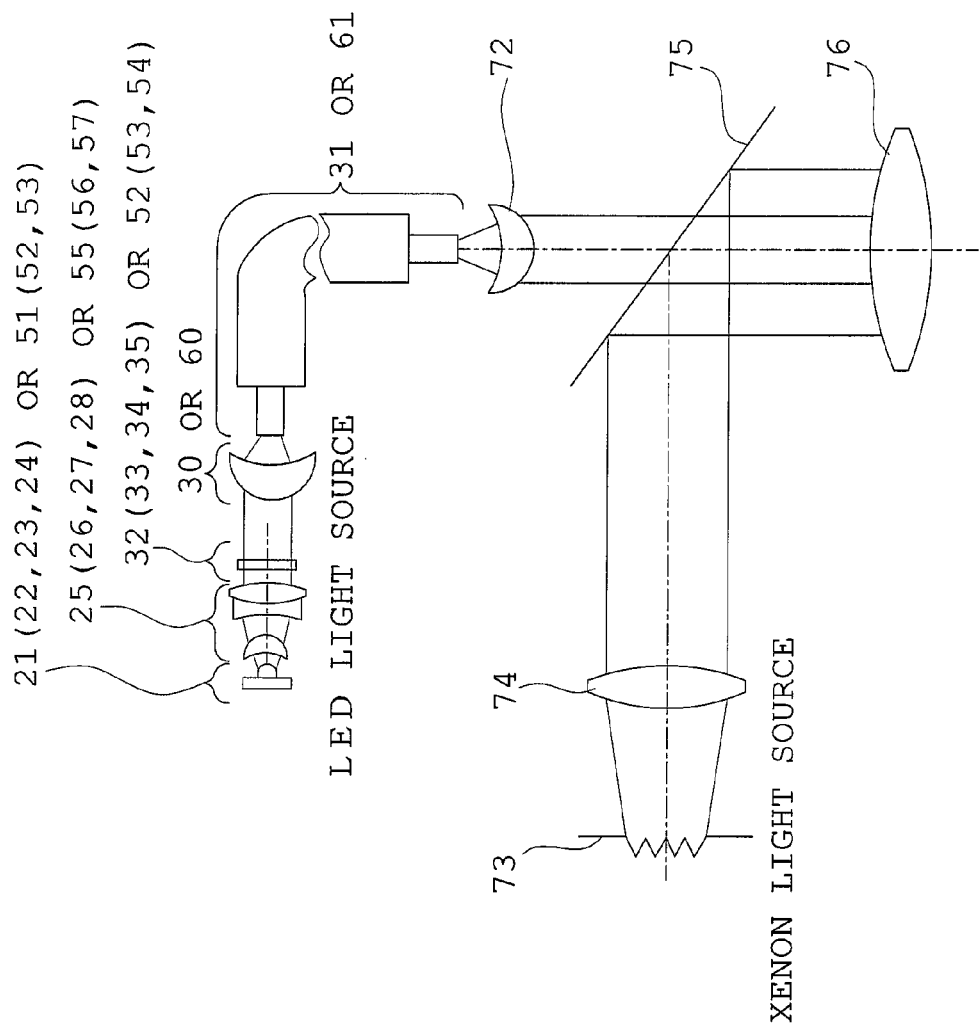
FIG. 8 is a schematic view illustrating the microscope illumination apparatus of a fourth embodiment in the present invention.
Figure 9:
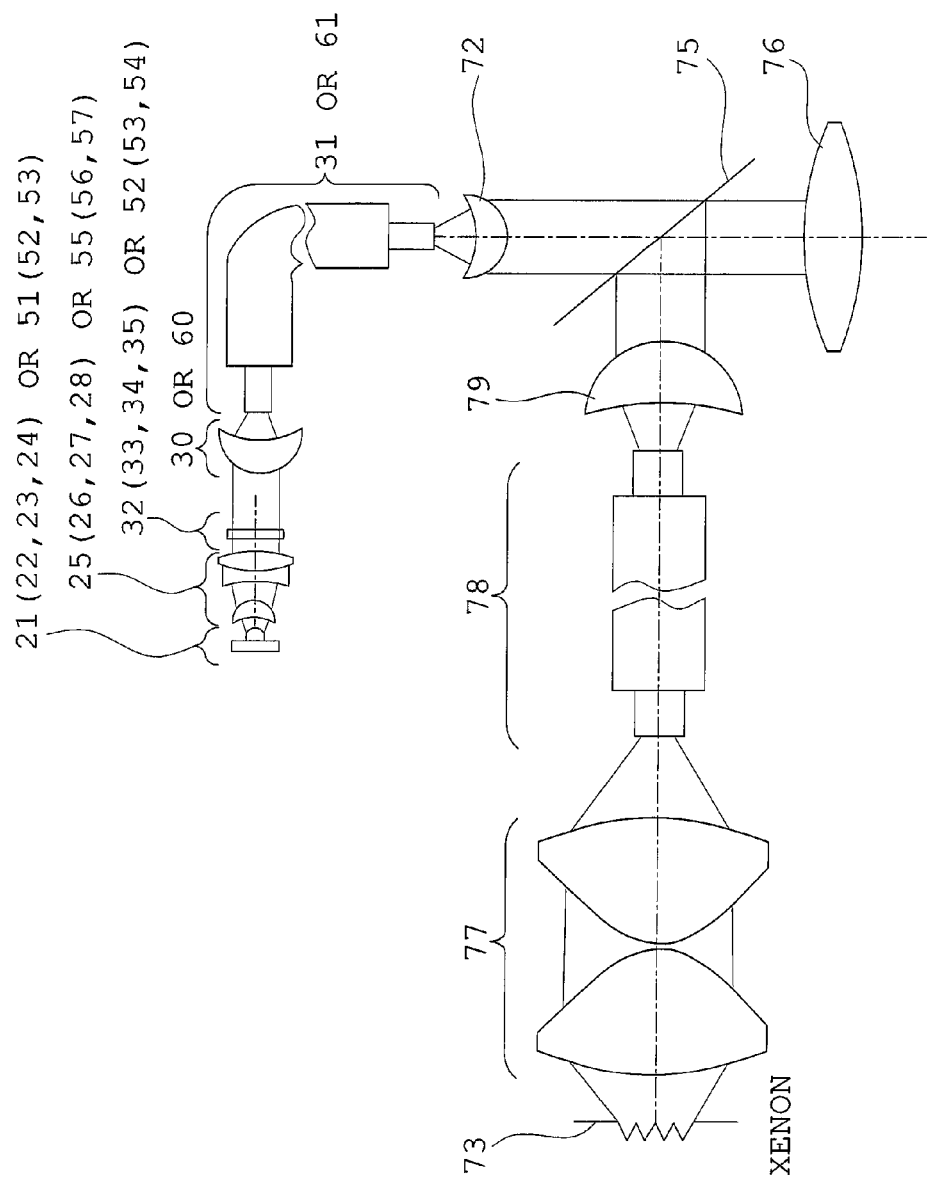
FIG. 9 is a schematic view illustrating the microscope illumination apparatus of a modified example of FIG. 8.

FIG. 8 shows the microscope illumination apparatus of the fourth embodiment in the present invention. FIG. 9 shows the microscope illumination apparatus of a modified example of FIG. 8.

The microscope illumination apparatus of the fourth embodiment is constructed as a reflection illumination apparatus for microscopes in which a microscope illumination apparatus (in which, for convenience, essential parts are omitted from FIGS. 8 and 9) transmitting light from the LED light sources through the optical fiber, constructed like the microscope illumination apparatus of the first or third embodiment, a microscope illumination apparatus (see FIG. 8) including a xenon light source 73 and a collimator lens 74, or a microscope illumination apparatus (see FIG. 9) including the xenon light source 73, an imaging lens 77, and an optical fiber 78, as the modified example, and transmitting light from the xenon light source 73 through the optical fiber 78 is placed on the optical axis of a projection lens 76 through a dichroic mirror 75. Also, in FIG. 8, reference numeral 72 denotes a collimator lens, and in FIG. 9, numeral 79 denotes a collimator lens.

The reflection illumination apparatus for microscopes is such that when cells are irradiated with light, only light emitted from the light source of the microscope illumination apparatus provided with either one of the LED light source and the xenon light source can be used for irradiation.

According to the microscope illumination apparatus of the fourth embodiment constructed as mentioned above, various light sources can be selected in a single apparatus. For example, in the case where labeled cells are bleached by illumination of light of wavelength in the ultraviolet region, illumination of light of wavelength in the infrared region is used and thereby the observation of the cells can be carried out without bleaching the cells even in exposure for a long period of time. In addition, the optical fiber has the advantage of enabling a structural arrangement space to be reduced. The projection lens can be shared.

The function and effect of the microscope illumination apparatus provided with the LED light sources are almost the same as in the microscope illumination apparatus of the first embodiment.

The microscope illumination apparatus of the present invention is useful for the fields of biology and medicine in which it is necessary that the microscope is used to observe a plurality of kinds of faint fluorescent light.

What is claimed is:

1. A microscope illumination apparatus, which has at least three kinds of light sources, each of a different emission wavelength region and a different shape and size of a light-emitting section, and supplies emitted light from individual light sources as illumination light for observing a specimen to a microscope boy, the microscope illumination apparatus comprising:
    collimator lenses converting incident rays into parallel rays, arranged on exit sides of the individual light sources;
    path sharing means introducing light emerging from the collimator lenses into a common optical path;
    an imaging lens placed on the common optical path, forming images of the individual light sources introduced into the common optical path through the path sharing means at a common position; and
    an optical fiber placed so that an entrance end face of the optical fiber is located at a position where the images of the individual light sources are formed through the imaging lens,
    wherein the path sharing means comprises a turret in which the at least three kinds of light sources and the collimator lenses corresponding to the light sources are held, and by rotation about a center axis, optical axes of each of the light sources and each of the collimator lenses can be aligned with the optical axis of the imaging lens.

2. A microscope illumination apparatus according to claim 1, wherein the collimator lenses are constructed so that magnification of the images of the light sources formed through the imaging lens vary with the emission wavelength regions and the shapes and sizes of the light-emitting sections in the light sources.

3. A microscope illumination apparatus according to claim 1, wherein one of the at least three kinds of light source is the light source emitting light of wavelength in an ultraviolet wavelength region, and the light source emitting light of wavelength in the ultraviolet wavelength region and the collimator lens corresponding to the light source are arranged so that an optical path length from the light source emitting light of wavelength in the ultraviolet wavelength region to the entrance end face of the optical fiber is shorter than the optical path length from any of remaining light sources to the entrance end face of the optical fiber.

4. A microscope illumination apparatus according to claim 1, wherein the path sharing means is constructed with dichroic mirrors, each located at a position where two optical paths cross.

5. A microscope illumination apparatus according to claim 4, wherein each of the dichroic mirrors is constructed to be movable to and out of a position where the two optical paths cross, including an optical path for light from each of light sources used as illumination light, of the at least three kinds of light sources.

6. A microscope illumination apparatus according to claim 1, wherein the path sharing means is mirrors, each movable to and out of a position where the two optical paths cross, including an optical path for light from each of light sources used an illumination light, of the at least three kinds of light sources.

7. A microscope illumination apparatus according to claim 1, wherein the collimator lenses are constructed to have optical properties varying with emission wavelength regions and shapes and sizes of light-emitting sections in the individual light sources so that an angle of incidence of light emitted from each of corresponding light sources on the optical fiber through the imaging lens becomes smaller than a critical angle of the optical fiber and each of the images of the light sources formed through the imaging lens has a maximum size such that an image is smaller than the entrance end face of the optical fiber.

* * * * *